UNITED STATES PATENT OFFICE.

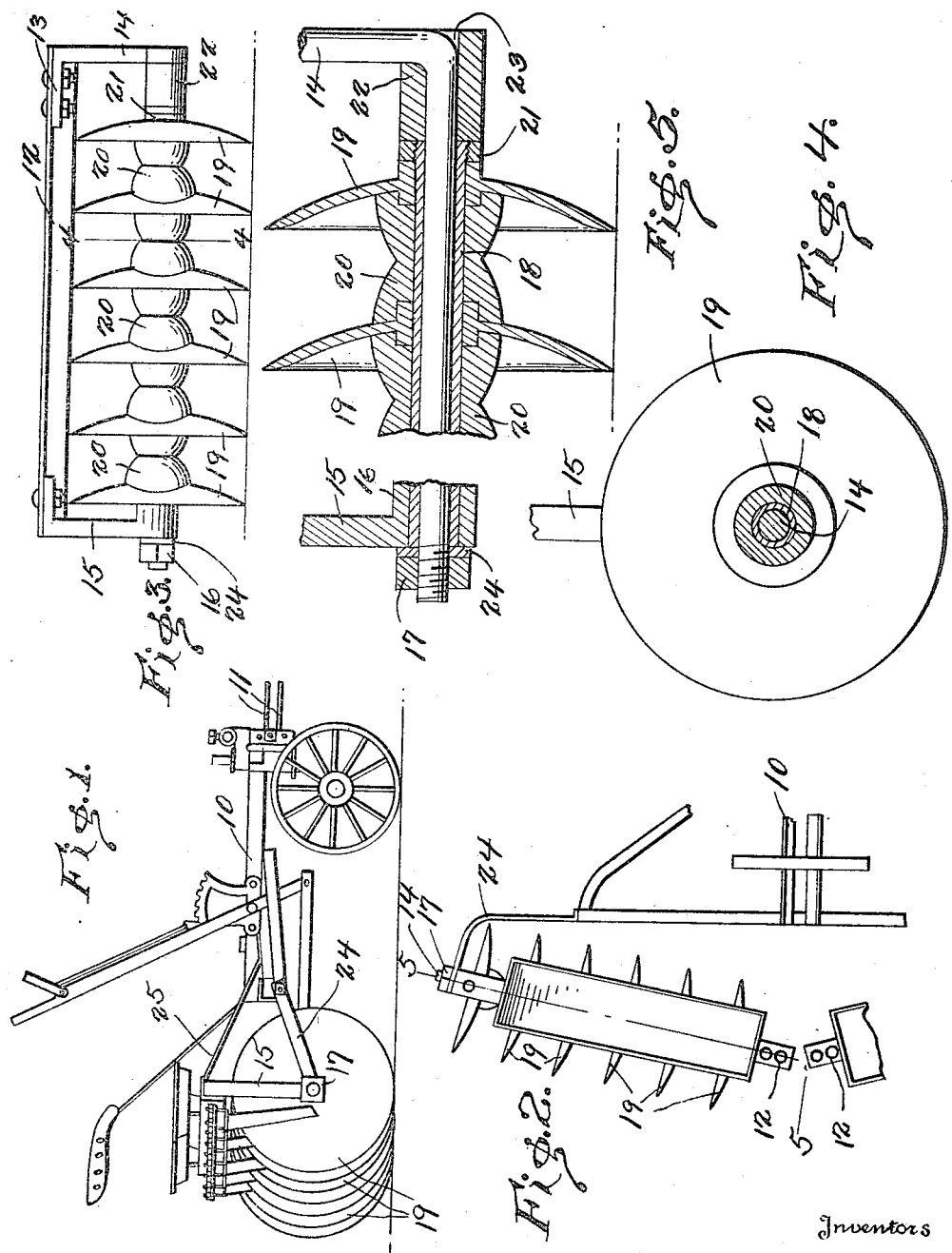

LESTER P. MATHES, ULYSSES L. MATHES, AND CHARLES H. RUSSELL, OF GRAND VALLEY, OKLAHOMA.

AGRICULTURAL MACHINE.

1,223,818.  Specification of Letters Patent.  Patented Apr. 24, 1917.

Application filed October 13, 1915, Serial No. 55,679. Renewed March 12, 1917. Serial No. 154,339.

*To all whom it may concern:*

Be it known that we, LESTER P. MATHES, ULYSSES L. MATHES, and CHARLES H. RUSSELL, citizens of the United States, residing at Grand Valley, in the county of Texas, State of Oklahoma, have invented certain new and useful Improvements in Agricultural Machines; and we do hereby declare the following to be a full, clear, and exact description of the invention such as will enable others skilled in the art to which it appertains to make and use the same.

This invention relates to improvements in agricultural machines and particularly to disk harrows.

The principal object of the invention is to provide a disk harrow in which the gang of disks are mounted on a single bearing, thus greatly facilitating the movements of the harrow by making the draft lighter.

Another object is to provide a device of this character which is simple in construction, effective in operation and which can be manufactured and sold at a comparatively low cost.

Other objects and advantages will be apparent from the following description when taken in connection with the accompanying drawing.

In the drawing:

Figure 1 is a side elevation of a disk harrow made in accordance with our invention;

Fig. 2 is a top plan view of a portion of the harrow;

Fig. 3 is a rear elevation of a portion of the harrow;

Fig. 4 is a vertical section on the line 4—4 of Fig. 3; and

Fig. 5 is a fragmentary longitudinal sectional view on the line 5—5 of Fig. 2.

Referring particularly to the accompanying drawing, 10 represents the frame of a harrow which is provided with the usual draft means 11. Secured to the underside of the frame are the two transversely extending bars 12, the same extending in a line transversely of the frame. As the following parts are duplicated on the other side of the machine it is thought necessary to describe only one side. Secured to the inner end of the bar 12 is the horizontal turned portion 13 of a depending member 14, the lower end of which is bent at right angles and extends to a point below the other end of the bar 12. Secured to this other end of the bar 12 is a second depending member 15, the lower end of which is provided with an eye 16 through which extends the last-named end of the member 14. This end of the member 14 extends beyond the eye and is threaded to receive a clamping nut 17. Rotatably mounted on this member 14 which forms a shaft, is a sleeve 18 extending practically the entire length of the member 14, and mounted on this sleeve are a plurality of harrow disks 19 between which are disposed the spacing sleeves or blocks 20. The portions of the sleeve outwardly of the inmost disks are threaded and receive thereon the nuts 21 which firmly clamp the disks and spacing blocks together. Slipped on the ends of the sleeve outwardly of the nuts are the cap members 22, each having a bifurcation in its outer end, as shown at 23 to receive the vertical members 13 and 15 to prevent rotation of the caps, but to permit the sleeve to freely rotate therewithin.

Engaged on each of the members 15 adjacent the lower ends of said members are the draw bars 24 which extend forwardly and around the front of the harrow where they are connected to the before-mentioned draft means.

This peculiar mounting of the disks on a single bearing sleeve produces a device which economizes on material used for bearings, thus providing a single bearing for one of the disks of each gang instead of separate bearings. The end caps 22 prevent dirt and sand from entering between the bearing sleeves and the shafts. The members 14 and 15 are properly braced with respect to the frame by means of the members 25 so that they will be held in a vertical depending position beneath the frame.

What is claimed is:

In a disk harrow, a shaft, a sleeve extending the length thereof and rotatably mounted thereon, a plurality of disks provided with hubs mounted on and rotatable with the sleeve, and approximately cylindrical blocks also mounted on the sleeve between the disks and having recesses formed in their ends for the reception of the said hubs.

In testimony whereof, we affix our signatures, in the presence of two witnesses.

LESTER P. MATHES.
ULYSSES L. MATHES.
CHARLES H. RUSSELL.

Witnesses:
R. E. LOVE,
GEORGE S. SPEAKMAN.

Copies of this patent may be obtained for five cents each, by addressing the "Commissioner of Patents, Washington, D. C."